Oct. 27, 1964  G. D. JOHNSON  3,154,781
RADAR ELEVATION DISPLAY
Filed March 30, 1960  2 Sheets-Sheet 1

INVENTOR
G. D. Johnson
BY
Q. Baxter Warner
Claude Funkhouser
ATTORNEYS

Oct. 27, 1964  G. D. JOHNSON  3,154,781
RADAR ELEVATION DISPLAY
Filed March 30, 1960  2 Sheets-Sheet 2
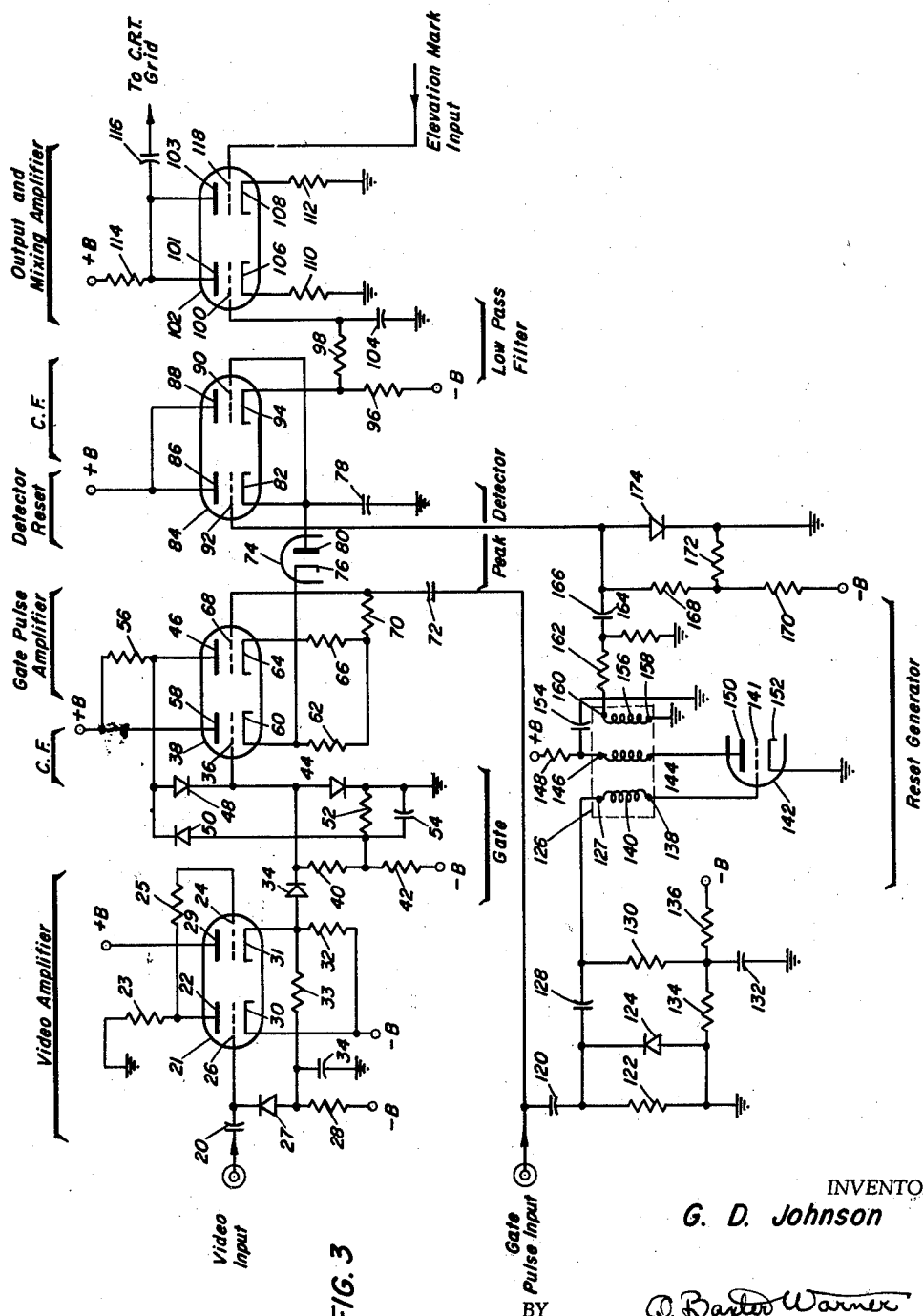
INVENTOR
G. D. Johnson
BY
Q. Baxter Warner
Claude Funkhouser
ATTORNEYS

United States Patent Office 3,154,781
Patented Oct. 27, 1964

3,154,781
RADAR ELEVATION DISPLAY
Glover D. Johnson, Morristown, N.J., assignor, by mesne assignments, to the United States of America as represented by the Secretary of the Navy
Filed Mar. 30, 1960, Ser. No. 18,785
5 Claims. (Cl. 343—16)

The present invention relates to radar tracking systems and more particularly to a new type of target elevation display system.

Elevation display systems provide displays necessary to permit an operator to initiate automatic elevation tracking of new targets, to supervise the operation on previously assigned targets, and to manually correct target tracking. The operator is responsible for initiating appropriate action to handle many targets simultaneously. It is, therefore, important to supply the operator with a display which will permit rapid and accurate tracking with a minimum of strain.

Prior art elevation displays have had the disadvantage that they have been unable to display single echo signals of short duration received by a radar system and, of course, have not been able to hold these signals on the tube face until the next information signal relative to a particular target appears.

A further disadvantage of prior art systems is encountered when the signal-to-noise ratio of an echo pulse is low. The operator under the latter mentioned conditions has to be extremely careful and attentive to detect a signal and distinguish it from noise.

The present invention overcomes the aforementioned difficulties by providing a new "dark-tube" display system in which the signals are integrated electrically before display on the cathode-ray tube and in which a signal produces a long (for example, 1300 μs.) pulse which illuminates many adjacent spots on the phosphor and is not disturbed by lack of synchronization of range and elevation sweeps.

An object of the present invention is to provide an improved elevation display system which will permit the operator to work rapidly, accurately, and with a minimum of strain.

Another object of the present invention is to provide an improved elevation display system which will provide a clear representation of the elevation of the target even when a very low signal-to-noise ratio is present.

Still another object of the present invention is to provide an improved elevation display system which will produce an illuminated display of relatively long persistence and high light intensity.

Other objects and many of the attendant advantages of this invention will be readily appreciated as the same becomes better understood by reference to the following detailed description when considered in connection with the acompanying drawings wherein:

FIG. 3 is the schematic wiring diagram of the embodiment set forth in the block diagram of FIG. 1.

In many types of presently used radar tracking systems the elevation console is called into service only after a PPI operator has determined the presence of a target and assigned a channel to it. As is well known, this assignment, in effect, surrounds the target with a gate region (in the X-Y plane) which is moved automatically or manually as the target moves. In these systems there is provided a device which produces an output each time the radar beam sweeps through the gate region.

Figure 1:
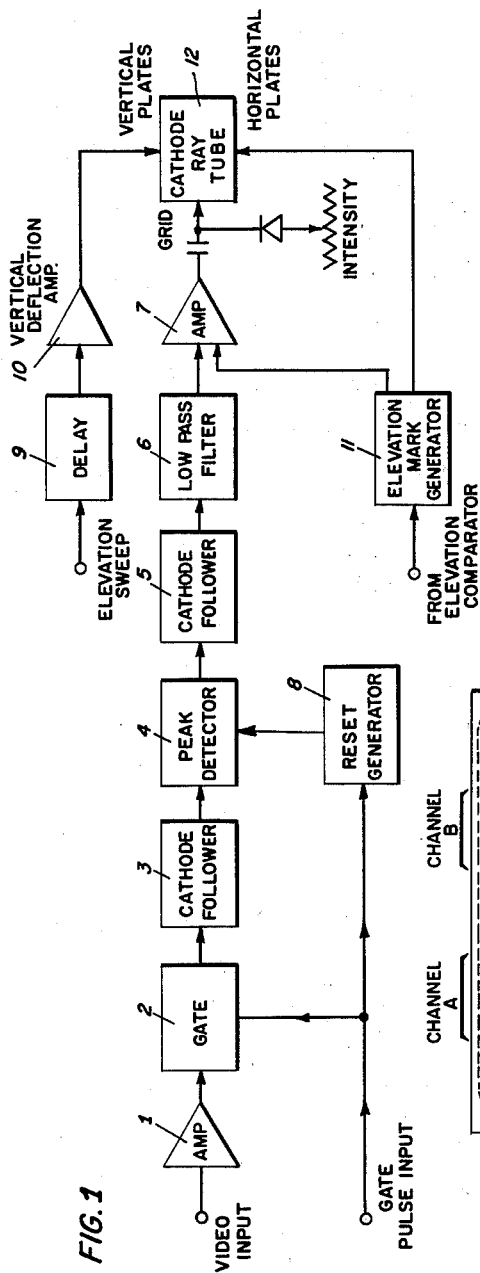
FIG. 1 is a block diagram of one embodiment of the present invention.

Referring now to the block diagram of FIG. 1 there is provided a gate pulse input which functions to receive the output produced each time the radar beam sweeps through the gate region. There is further provided a video input which receives the video signal from the search radar and delivers it to amplifier 1 where the signal is amplified and then passed through gate 2 when the gate pulse is present at the gate pulse input. A cathode-follower 3 is provided to minimize loading of the gate 2. The signal is then delivered to the peak or "box car" detector 4 which measures the maximum amplitude of the signal (or noise) occurring in the gated video during each range sweep within the gate region. As will be explained later, this amplitude is held constant until a new gate pulse appears (for example, in about 330 μs.). The leading edge of this new gate pulse triggers the reset generator 8 which restores the peak detector to its initial uncharged condition, ready to measure and hold the maximum amplitude of the signal on succeeding passes of the radar beam through the gate region. A cathode follower 5 is provided to minimize loading of the peak detector circuit.

The low-pass filter 6 provides electrical integration of the signal and noise output from the peak detector. Since the radar returns, for example, only four signal pulses from the target each revolution, the time-constant of the low pass filter is chosen to be about equal to the time required for the receipt of these four pulses, namely, four times 330 μs. or about 1300 μs. Thus, if the signal is assumed to be composed of four pulses, each equal in amplitude to the peak noise gated from the radar, then, theoretically, a signal output from the filter will be greater than the noise output by the ratio of $4/\sqrt{4}$ or two times. In addition, the signal output from the filter is a long pulse (for example 1300 μs.) and will thus illuminate a long trace on the cathode-ray tube, thereby improving visibility.

An amplifier 7 raises the level of the output from the low-pass filter to a value large enough to drive the grid of the cathode-ray tube. Since this amplifier does not have to handle high-frequency video signals, a simple triode with low current drain suffices. This amplifier also contains a mixer to permit the display of an illuminated elevation mark as well as the target signal.

The mixed output of the amplifier is coupled through a capacitor to the grid of the cathode-ray tube 12. A clamp circuit is provided at the grid to restore the D.C. component of the signal and noise. An intensity control is also provided to set the average grid voltage, and is adjusted so that the gated integrated noise drives the grid up to a voltage just below the point where the screen is perceptibly illuminated. Then any integrated signal above the noise level will drive the grid more positive and up into the region of greater screen illumination. Thus even where the signal amplitude is lower than the peak noise amplitude a target signal will appear on the elevation display.

Since the low-pass filter 6 delays as well as integrates the signal it is necessary to compensate by providing a delay circuit 9 consisting of a similar filter giving an appropriate amount of delay to the elevation sweep circuit so that the signal received by the vertical deflection amplifier 10 will be retarded so that a signal at zero elevation will appear in its proper place at the beginning of the sweep.

As previously mentioned, an elevation mark is presented on the cathode-ray tube screen showing the elevation position of either (a) the tracking channel or (b) the manual elevation control. This mark is produced in the elevation mark generator 11 which provides an intensification signal to the mixing amplifier 7 and also a small deflection voltage to the horizontal plates of the cathode-ray tube. The mark generator 11 can be any well known triggered pulse generator adapted to emit pulses of relatively short time duration in comparison to the output from filter 6. This circuit is energized from any well known voltage comparator which compares the delayed elevation sweep with a voltage from the track channel or from the manual elevation control, and when coincidence is obtained, produces an output which triggers the mark generator and illuminates the cathode-ray tube at the proper elevation.

Referring now to the schematic diagram of FIG. 3, the video signal is applied to the video amplifier through a capacitor 20. The video amplifier consists of a duo-triode tube having its plate 22 connected to ground through a resistor 23 and further coupled to the grid 24 through a resistor 25. The input grid 26 is connected to the capacitor 20 and through a diode 27 and a resistor 28 to —B. The plate 29 of tube 21 is tied directly to +B and the cathode 30 is connected directly to —B. Cathode 31 is tied to —B by resistor 32 and is further connected to the common junction between the diode 27 and resistor 28 by resistor 33. This common junction is also returned to ground by capacitor 34. The output of the video amplifier is taken from the cathode 31 and delivered to the gate-circuit by means of a diode 34 which is connected directly to the grid 36 of the tube 38. Grid 36 is returned to ground by series resistors 40 and 52 and also by diode 44 and is coupled to the plate 46 by diode 48, the plate 46 being further connected by diode 50 to the common junction between resistors 40 and 42, the latter resistor is connected directly to —B. This common junction is also returned to ground by resistor 52 in parallel with capacitor 54. Plate 46 is tied to +B by resistor 56 and plate 58 is connected to +B by direct connection.

The cathode 60 of tube 38 is connected to —B by resistor 62 and is also coupled to the peak detector. Cathode 64 is connected to —B by means of resistor 66. The grid 68 of tube 38 is connected to —B by resistor 70 and to the gate pulse input by capacitor 72. The peak detector consisting of tube 74 receives the signal at its cathode 76 and delivers it to a capacitor 78 through its plate 80, the capacitor 78 being grounded at one end and being connected to a cathode 82 of tube 84 at the other. The capacitor 78 serves to maintain the level of the peaks detected by the peak detector as previously mentioned. The dual triode tube 84 which serves the dual purpose of a detector reset and a cathode follower has its plates 86 and 88 tied directly to +B. The grid 90 of tube 84 is connected to the cathode 82. The grid 92 of tube 84 serves as an input for the signal received from the reset generator. The cathode 94 of tube 84 is tied to —B by resistor 96 and provides the output of the cathode follower by resistor 98 to the input grid 100 of the tube 102 which serves as the output and mixing amplifier. The input grid 100 is further returned to ground through capacitor 104 which in conjunction with resistor 98 forms the low pass filter. The cathodes 106 and 108 are returned to ground by resistors 110 and 112 respectively. The plates 101 and 103 of tube 102 are connected in common to +B by resistor 114 and further are coupled to the grid of the cathode ray tube by capacitor 116. The grid 118 of tube 102 serves as an input for the signals received from the elevation mark generator.

Returning now to the gate pulse input it will be readily noted that the signal is delivered directly to the grid 68 of tube 38 and to the reset generator by capacitor 120 which is connected to ground by resistor 122 in parallel with diode 124. The common connection between capacitor 120 and resistor 122 is further connected to a transformer 126 by capacitor 128, capacitor 128 being further connected to ground by resistor 130 in series with capacitor 132. The common connection between resistor 130 and capacitor 132 is returned to ground by resistor 134 and connected to —B by resistor 136. The free end 138 of transformer coil 140 is connected to the grid 141 of tube 142. The coil 144 of transformer 126 has its end 146 tied to +B by resistor 148 and the other end connected to the plate 150 of tube 142. The cathode 152 of tube 142 is returned directly to ground. Terminal 146 of transformer 126 is further returned to ground by capacitor 154. The coil 156 of transformer 126 has its end 158 grounded and its terminal 160 connected to ground through series resistor 162 and resistor 164, the common junction between these two resistors being tied to a capacitor 166. The free end of capacitor 166 is tied to —B through series resistors 168 and 170, the common connection between resistors 168 and 170 being returned to ground by resistor 172. The previously mentioned free end of capacitor 166 is tied to ground by diode 174 and is further coupled directly to grid 92 of tube 84.

Figure 2:
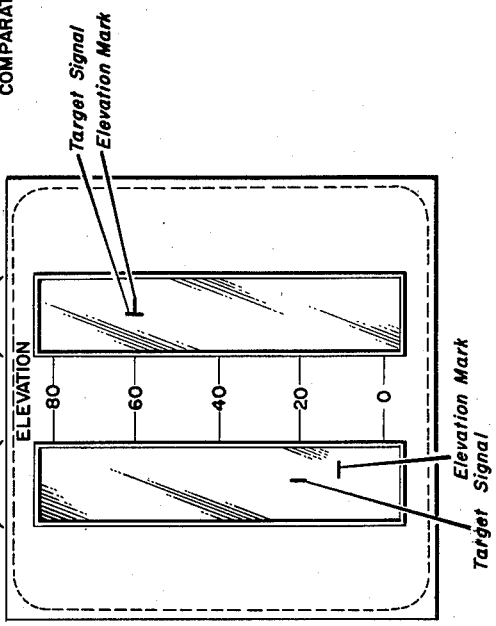
FIG. 2 is a showing of one form of display that might be employed with the present system.

By utilizing the system of the present invention the display on the cathode ray tube screen differs from the usual radar presentation in that there is no visible background noise pattern, and thus it has been called a "dark-tube" display or one in which the screen is illuminated only by targets. FIG. 2 illustrates one form of display that might be employed using a 5½ inch two-gun cathode-ray tube with the circuit of FIGS. 1 and 3 connected to each set of deflection plates. With the more advanced radars now being used which cover a range in elevation of between 0 and 80° in one beam, each tube will be able to present simultaneously the elevation information of two channels. In channel A (see FIG. 2) a target is shown at 20° elevation with an elevation marker at 10°, indicating that this target is not being tracked and requires attention. In channel B a target is shown at 60° elevation and the elevation marker alongside shows it is being tracked satisfactorily and requires no attention. It will be seen that the target shows up as a long vertical dash of light. The length of this dash is proportional to the elevation beam width of the radar antenna, and as the target elevation changes, the illuminated spot likewise moves up or down. No range information is shown on the elevation display, but is, of course, available on the PPI display.

From the foregoing description it is evident that the system of the present invention provides a significant advancement in the radar elevation display art. By the use of the system of the present invention the requirement for extremely close observation of the elevation display in order to detect targets is eliminated. Thus, an operator may perform other duties as well as observe the elevation display and thus not suffer from the strain of extremely close observation. Over and above these advantages the circuitry of the present invention provides a system which is more reliable than those employed in the prior art.

Obviously many modifications and variations of the present invention are possible in the light of the above teachings. It is therefore to be understood, that within the scope of the appended claims, the invention may be practiced otherwise than as specifically described.

What is claimed is:

1. In a system for providing an elevation display of target information, a connection for a video signal input, a connection for a gating signal input, a first amplifier coupled to said connection for a video signal input for amplifying the signal applied thereto, gate means coupled to the output of said first amplifier and to the connection for the gating signal input and having an output coupled to a first cathode follower for preventing overloading of the gate means, said first cathode follower having an output operatively associated with a peak detector having a second input coupled to the output of a reset generator having its input directly connected to the connection for the gating signal input, the output of said gate detector being applied to a second cathode follower, said second cathode follower circuit having its output coupled to a low pass filter, second amplifier means connected to the output of the low pass filter and to an elevation mark generator, said elevation mark generator having an input connection and two output connections, one of said output connections being connected to a cathode ray tube, said second amplifier having its output connected to a capacitor, said capacitor having its output connected to the cathode ray tube, a connection for an elevation sweep signal, and a delay circuit connected to said connection for an elevation sweep signal and having its output coupled to a vertical deflection amplifier, said vertical deflection amplifier being operatively associated with the vertical plates of the cathode ray tube whereby the elevation information of targets is displayed by a high persistence image.

2. In a system for displaying information of target position, gating means for gating an input information signal, detector means connected to said gating means for detecting the amplitudes of said information signal, filter means coupled to said detector means for integrating the signals applied thereto, cathode ray tube means having an input connected to said filter means, delay means for delaying a second signal in order to cause said second signal to be synchronized with said information signal, and amplifier means connected to said delay means and having an output coupled to the vertical deflection plates of said cathode ray tube.

3. A system for providing elevation display information, in combination, gating means for gating input signal information, reset generator means providing reset signal, peak detector means having an input connected to said gating means and a second input connected to said reset generator means, and a cathode ray tube for displaying said elevation signal information having its input grid connected to said detector means.

4. In a system for displaying elevation target information, a gating means for permitting input information to be gated therethrough, peak detector means connected to said gating means for detecting the peak amplitudes of signals which are permitted to be gated by said gating means and for maintaining said peak amplitudes until a reset signal is transmitted thereto, a reset generator means connected to said peak detector means for providing a reset signal, and a cathode ray tube connected to said detector means for displaying said maintained peak amplitudes.

5. A system for displaying target elevation position information comprising, a gating means for gating an input signal at a pre-determined time, reset generator means for providing a reset signal at a pre-determined time, peak detector means connected to said gating means and said reset generator means for detecting the peak amplitude of said input signal and for maintaining said amplitude constant until a reset signal is received from said reset generator, and low pass filter means connected to said peak detector means for integrating said constantly maintained amplitude and for providing an output which is proportional to said detected signal.

References Cited in the file of this patent

UNITED STATES PATENTS

| | | |
|---|---|---|
| 2,555,101 | Alvarez | May 29, 1951 |
| 2,771,601 | Stewart | Nov. 20, 1956 |
| 2,995,744 | Covely | Aug. 8, 1961 |